United States Patent
Santra et al.

(10) Patent No.: US 10,775,482 B2
(45) Date of Patent: Sep. 15, 2020

(54) HUMAN DETECTION AND IDENTIFICATION IN A SETTING USING MILLIMETER-WAVE RADAR

(71) Applicant: Infineon Technologies AG, Neubiberg (DE)

(72) Inventors: Avik Santra, Munich (DE); Ashutosh Baheti, Munich (DE); Jagjit Singh Bal, Fremont, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 327 days.

(21) Appl. No.: 15/950,615

(22) Filed: Apr. 11, 2018

(65) Prior Publication Data

US 2019/0317191 A1  Oct. 17, 2019

(51) Int. Cl.
G01S 7/41 (2006.01)
G01S 7/295 (2006.01)
G06F 17/14 (2006.01)
G01S 13/88 (2006.01)

(52) U.S. Cl.
CPC ............... G01S 7/41 (2013.01); G01S 7/295 (2013.01); G06F 17/14 (2013.01); G01S 7/414 (2013.01); G01S 13/88 (2013.01)

(58) Field of Classification Search
None
See application file for complete search history.

(56) References Cited

U.S. PATENT DOCUMENTS

| 4,241,347 A | 12/1980 | Albanese et al. |
| 6,147,572 A | 11/2000 | Kaminski et al. |
| 6,304,178 B1 | 10/2001 | Hayashida |
| 6,414,631 B1 | 7/2002 | Fujimoto |

(Continued)

FOREIGN PATENT DOCUMENTS

| CN | 1463161 A | 12/2003 |
| CN | 203950036 U | 11/2004 |

(Continued)

OTHER PUBLICATIONS

Infineon, "Using BGT24MTR11 in Low Power Applications", BGT24MTR11, 24 Ghz Radar, RF and Protection Devices, Application Note AN341, Revision: Rev. 1.0, Dec. 2, 2013, 25 pages.

(Continued)

Primary Examiner — Peter M Bythrow
(74) Attorney, Agent, or Firm — Slater Matsil, LLP

(57) ABSTRACT

A method for human detection includes: receiving first and second echo signals using a millimeter-wave radar to produce first and second sets of data, respectively; selecting first and second angles based on the first and second sets of data, respectively; performing a FrFT on the first set of data using the first angle; identifying first targets by comparing peaks of the FrFT of the first set of data with a first threshold; performing a FrFT on the second set of data using the second angle; identifying second targets by comparing peaks of the FrFT of the second set of data with the first threshold; generating a set of target tracks based on the identified first and second targets; and associating a target track with a human track based on comparing each target track of the set of target tracks with a set of reference track signatures.

25 Claims, 12 Drawing Sheets

(56) References Cited

U.S. PATENT DOCUMENTS

| | | | |
|---|---|---|---|
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2* | 1/2008 | Arikan | G01S 13/524 |
| | | | 342/104 |
| 7,474,258 B1* | 1/2009 | Arikan | G01S 7/292 |
| | | | 342/107 |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,714,797 B2* | 7/2017 | Groot | G01S 7/415 |
| 2002/0030623 A1* | 3/2002 | Arikan | G01S 7/295 |
| | | | 342/195 |
| 2003/0179127 A1 | 9/2003 | Wienand | |
| 2004/0178942 A1* | 9/2004 | McLemore | G01S 13/888 |
| | | | 342/22 |
| 2004/0238857 A1 | 12/2004 | Beroz et al. | |
| 2006/0001572 A1 | 1/2006 | Gaudier et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0238762 A1* | 10/2008 | Gumas | G01S 7/295 |
| | | | 342/99 |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0068876 A1* | 3/2012 | Bangera | G06F 3/017 |
| | | | 342/27 |
| 2012/0087230 A1 | 4/2012 | Guo et al. | |
| 2012/0092284 A1 | 4/2012 | Rofougaran et al. | |
| 2012/0105267 A1* | 5/2012 | DeLia | G01V 8/005 |
| | | | 342/22 |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2013/0113647 A1* | 5/2013 | Sentelle | G01S 13/887 |
| | | | 342/22 |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0316261 A1* | 10/2014 | Lux | G01S 13/56 |
| | | | 600/430 |
| 2014/0324888 A1 | 10/2014 | Xie et al. | |
| 2015/0061926 A1* | 3/2015 | Ranney | G01S 13/9089 |
| | | | 342/25 B |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0187462 A1 | 6/2016 | Altus et al. | |
| 2016/0191232 A1 | 6/2016 | Subburaj et al. | |
| 2016/0200276 A1* | 7/2016 | Diewald | G01S 13/56 |
| | | | 342/28 |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1* | 3/2017 | Adib | G01S 13/72 |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0139043 A1* | 5/2017 | Takada | G01S 13/931 |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0011182 A1* | 1/2018 | Sud | G01S 7/023 |
| 2018/0046255 A1 | 2/2018 | Rothera et al. | |
| 2018/0101239 A1 | 4/2018 | Yin et al. | |
| 2018/0106897 A1* | 4/2018 | Shouldice | G01S 13/56 |
| 2018/0120420 A1* | 5/2018 | McMahon | G01S 13/62 |
| 2018/0192919 A1* | 7/2018 | Nakayama | A61B 5/1113 |
| 2019/0196004 A1* | 6/2019 | Zhao | G01S 13/34 |

FOREIGN PATENT DOCUMENTS

| | | |
|---|---|---|
| CN | 1716695 A | 1/2006 |
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |

(56) References Cited

FOREIGN PATENT DOCUMENTS

| | | |
|---|---|---|
| EP | 1732247 A1 | 12/2006 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2009129232 A1 | 10/2009 |
| WO | 2013009473 A2 | 1/2013 |
| WO | 2016033361 A1 | 3/2016 |
| WO | 2017151682 A1 | 9/2017 |

OTHER PUBLICATIONS

Texas Instruments, "XWR1xxx Power Management Optimizations—Low Cost LC Filter Solution", Application Report SWRA577—Oct. 2017, 19 pages.

Texas Instruments, "Programming Chirp Parameters in TI Radar Devices", Application Report SWRA553—May 2017, 15 pages.

Chen, X. et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, 17 pages.

Chen, X. et al., "Detection and Extraction of Marine Target with Micromotion via Short-time Fractional Fourier Transform in Sparse Domain", Department of Electronic and Information Engineering, Information Fusion Research Institute, Naval Aeronautical and Astronautical University, Aug. 5-8, 2016, 5 pages.

Kizhakkel, V. "Pulsed Radar Target Recognition Based on Micro-Doppler Signatures Usigin Wavelet Analysis", A Thesis, Presented in Partial Fulfillment of the Requirements for the Degree Master of Science in the Graduate School of the Ohio State University, Aug. 2013, 118 pages.

Thayaparan, T. et al. "Micro-Doppler Radar Signatures for Intelligent Target Recognition", Defence Research and Development Canada, Technical Memorandum, Sep. 2004, 73 pages.

Thayaparan, T. et al. "Intelligent Target Recognition using Micro-Doppler Radar Signatures", Proc. of SPIE vol. 7308 730817-11, Dec. 9, 2009, 11 pages.

Santra, Avik et al., "Short-Range Millimetric-Wave Radar System for Occupancy Sensing Application", Sensor Applications, vol. 1, No. 3, Jul. 2017, 4 pages.

Richards, Mark A., "Fundamentals of Radar Signal Processing," McGraw Hill Electronic Engineering, ISBN: 0-07-144474-2, Jun. 2005, 93 pages.

Chen, Xiaolong et a., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du "Chinese Doctoral Dissertations & Master's Theses Full Text Database (Masters)—Information Science and Technology Series," China National Knowledge Infrastructure, ISSN 1674-0246, CN 11-9144/G, Dec. 16, 2004—Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Council, 3500104, vol. 1, No. 1, Feb. 2017, 4 pages.

Dooring Alert Systems, "Dooring Alert Systems Riders Matter" http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 18 pages.

Kuehnke, Lutz, "Phased Array Calibration Procedures Based on Measured Element Patterns," 2001 Eleventh International Conference on Antennas and Propagation, IEEE Conf., Pubi. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-doppler radar signatures," Defence R&D Canada, Radar Sensor Technology III, Proc. of SPIE, vol. 7308, 730817, Dec. 9, 2009, 11 pages.

Thayaparan, T. et al. "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

* cited by examiner

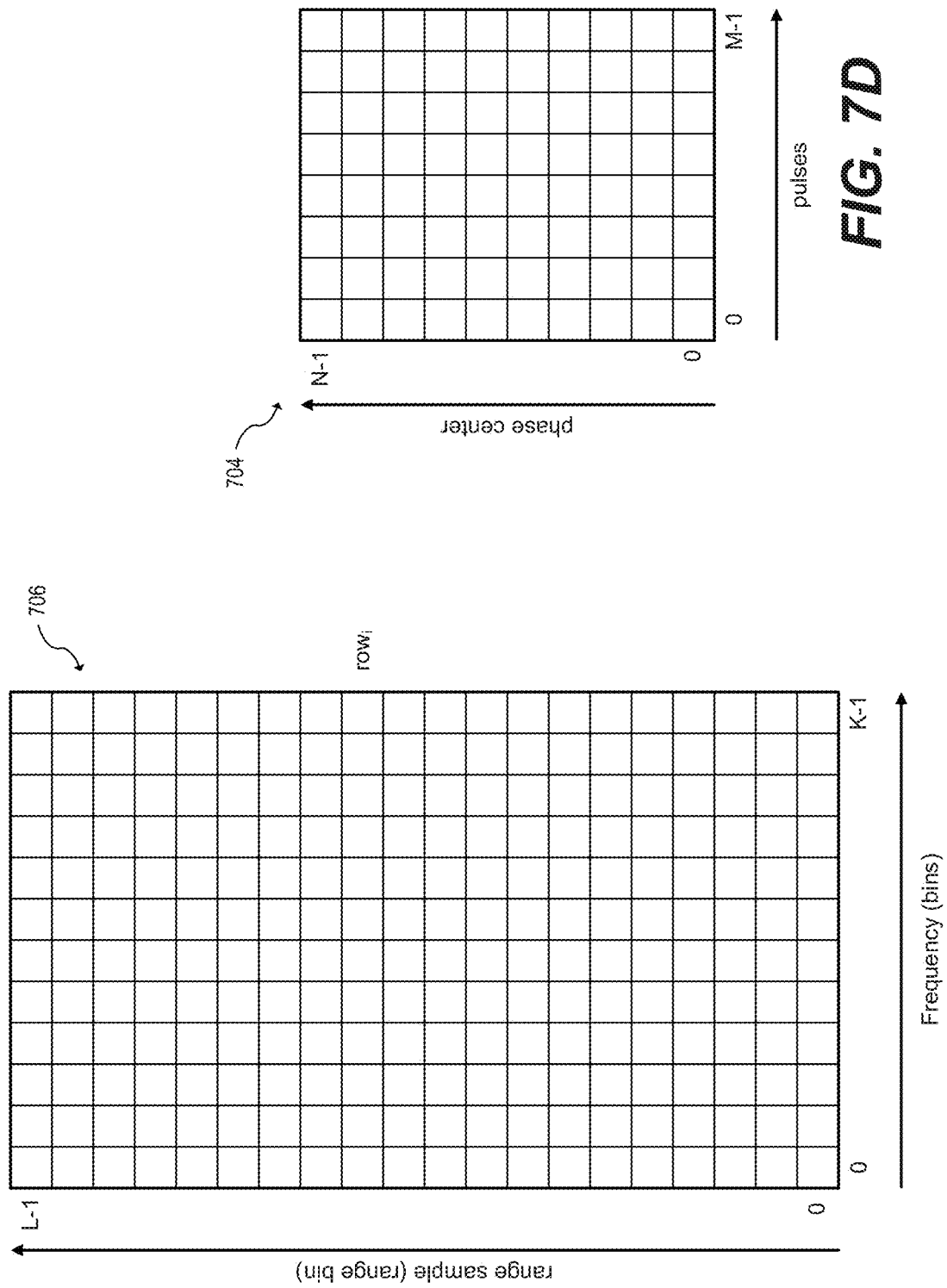

HUMAN DETECTION AND IDENTIFICATION IN A SETTING USING MILLIMETER-WAVE RADAR

TECHNICAL FIELD

The present invention relates generally to a system and method for human detection and identification in a factory floor using millimeter-wave radar.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, a receive antenna to receive the RF, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method for human detection includes: transmitting a plurality of chirps towards objects of a scene using a millimeter-wave radar to produce echo signals; receiving a first echo signal using the millimeter-wave radar to produce a first set of data; identifying first initial targets based on the first set of data; selecting a first angle based on the first set of data; performing a Fractional Fourier Transform (FrFT) on the first set of data based on the first initial targets using the first angle; identifying first targets by comparing peaks of the FrFT of the first set of data with a first threshold; after receiving the first echo signal, receiving a second echo signal using the millimeter-wave radar to produce a second set of data; identifying second initial targets based on the second set of data; selecting a second angle based on the second set of data, where the second angle is different from the first angle; performing a FrFT on the second set of data based on the second initial targets using the second angle; identifying second targets by comparing peaks of the FrFT of the second set of data with the first threshold; generating a set of target tracks based on the identified first and second targets; comparing each target track of the set of target tracks with a set of reference track signatures to generate a respective target track comparison result; and associating a target track with a human track based on the respective target track comparison result.

In accordance with an embodiment, a system includes: a processor configured to be coupled to a millimeter-wave radar sensor circuit, the processor configured to: receive from the millimeter-wave radar sensor circuit a first set of data and a second set of data; identify first initial targets based on the first set of data; select a first angle based on the first set of data; perform a FrFT on the first set of data based on the first initial targets using the first angle; identify first targets by comparing peaks of the FrFT of the first set of data with a first threshold; select a second angle based on the second set of data, where the second angle is different from the first angle; identify second initial targets based on the second set of data; perform a FrFT on the second set of data based on the second initial targets using the second angle; identify second targets by comparing peaks of the FrFT of the second set of data with the first threshold; track identified targets based on the identified first and second targets; and compare the tracked identified targets with reference track signatures to detect humans.

In accordance with an embodiment, a millimeter-wave radar includes: a millimeter-wave radar sensor circuit configured to: continuously transmit a plurality of chirps towards objects of a scene to produce echo signals, receive a first echo signal using the millimeter-wave radar to produce a first set of data, and after receiving the first echo signal, receive a second echo signal to produce a second set of data; and a processor configured to: select a first angle based on the first set of data, perform a FrFT on the first set of data using the first angle, identify first targets by comparing peaks of the FrFT of the first set of data with a first threshold, select a second angle based on the second set of data, where the second angle is different from the first angle, perform a FrFT on the second set of data using the second angle, identify second targets by comparing peaks of the FrFT of the second set of data with the first threshold, track identified targets based on the identified first and second targets, and compare the tracked identified targets with reference track signatures to detect humans.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7A-7D show graphical representations of echo signals captured and/or processed by the millimeter-wave radar of FIG. 3, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a system and method of human detection and identification in an industrial setting that includes machinery with moving parts using a millimeter-wave radar system. Embodiments of the present invention may be used in different settings. Some embodiments may be used to detect and identify objects other than humans, such as animals.

Figure 1:
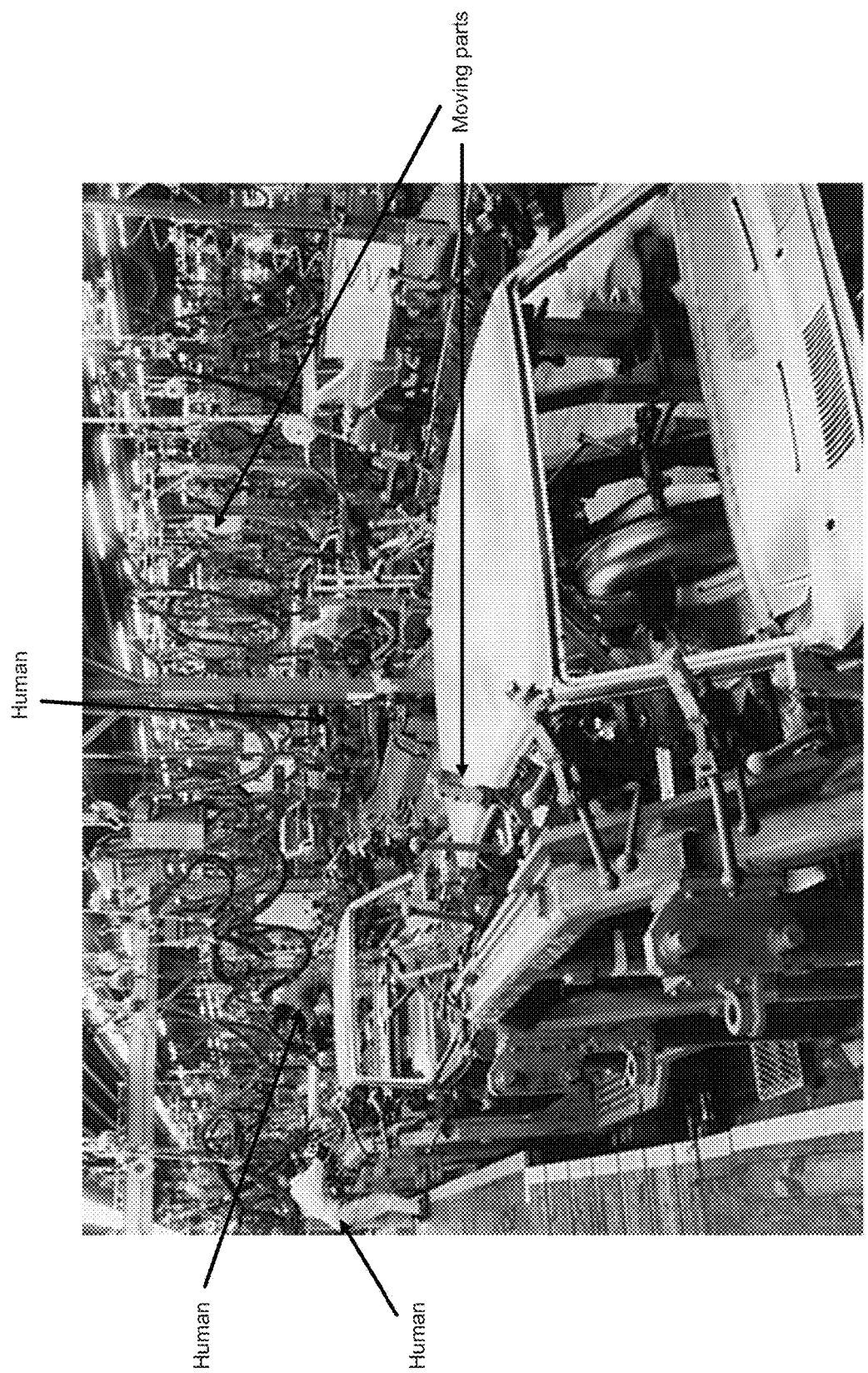
FIG. 1 shows a factory floor of an automotive assembly plant including humans coexisting with moving pails.
Figure 2:
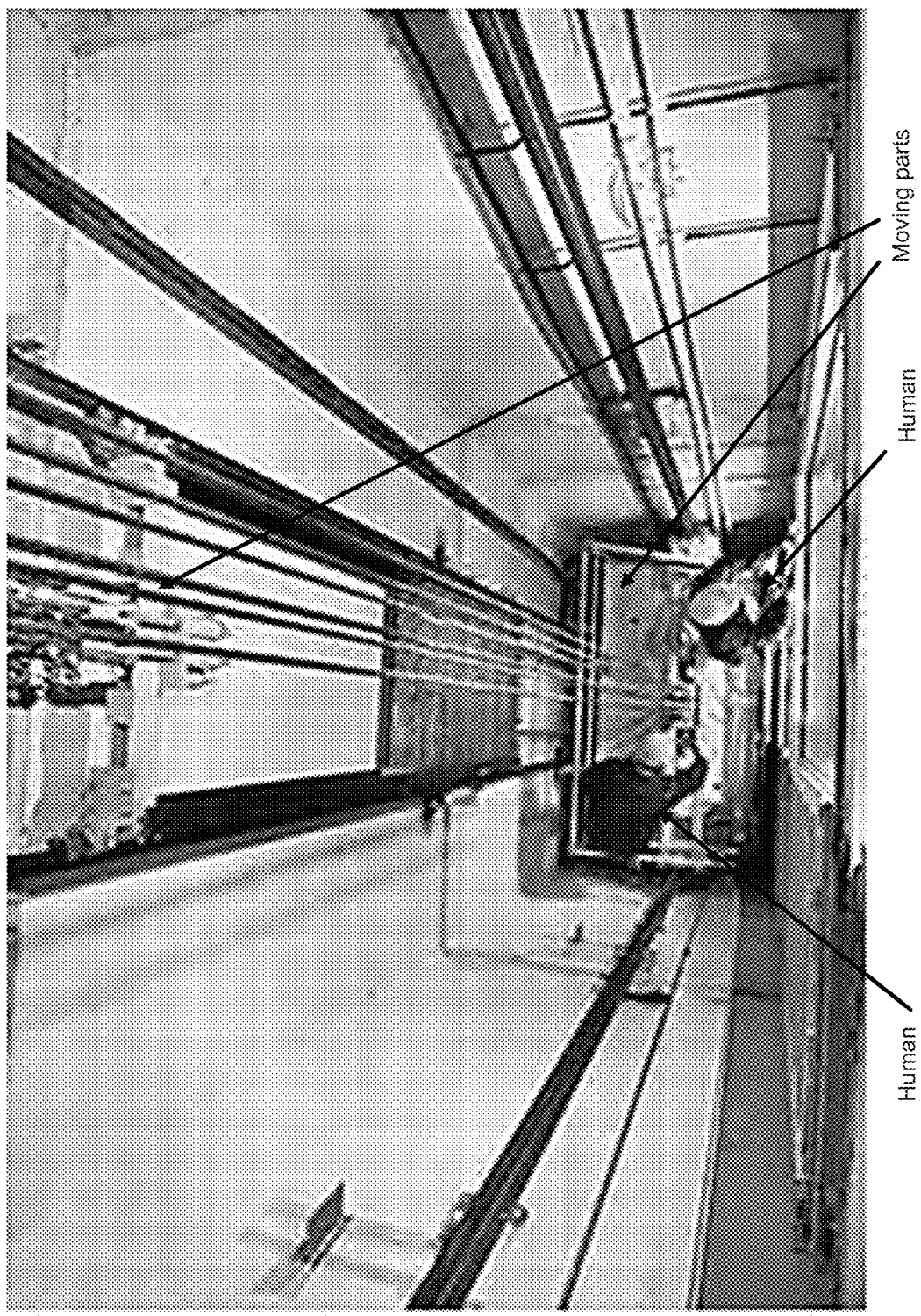
FIG. 2 shows an elevator in an elevator shaft including humans coexisting with moving parts.

In some settings, machinery having a plurality of moving parts coexists with humans. For example, FIG. 1 shows a factory floor of an automotive assembly plant that includes employees coexisting with moving parts. FIG. 2 shows an elevator in an elevator shaft including installers/repairers coexisting with moving parts.

The injury rate of humans when interacting with machinery may be significant. It is, therefore, advantageous to predict, prevent, warn, and/or react to events in, for example, a factory setting, to reduce or eliminate the risk of injury to humans. Embodiments of the present invention detect humans in various settings, such as a factory floor, using a radar based solution. Some embodiments count the number of humans in a given setting at any given time and track each of the humans. The human identification and tracking information may be used, for example, to warn of dangerous conditions, such as when a human is too close to a moving part.

Some embodiments perform activity recognition, such as detecting if a human is lying on the floor, and then taking action based on the activity detected. In some embodiments, upon a triggering event (e.g., human lying on the floor), actions such as alerting authorities, initiating first-aid procedure, and/or stopping one or more of the moving parts, are taken. Some embodiments perform identification of the humans to, for example, track an evacuation procedure.

An industrial setting, such as the factory floor shown in FIG. 1, may include various types of objects at different times. For example, the factory floor may include static objects (e.g., furniture), moving machinery (e.g., robotic arms), and other moving equipment (e.g., fans). Moving equipment such as a fan, exhibits periodic movements with medium to low intensity. Machinery typically exhibits periodic movements with strong intensity, although machinery often exhibits longer periods of periodic movement as opposed to moving equipment such as fans.

Humans present in the industrial setting may be, for example, moving (e.g., walking), standing (e.g., little or no movement), or lying on the floor (e.g., as a result of an accident). Humans typically move in an aperiodic way and with low intensity when compared to the movements of machinery.

Figure 3:
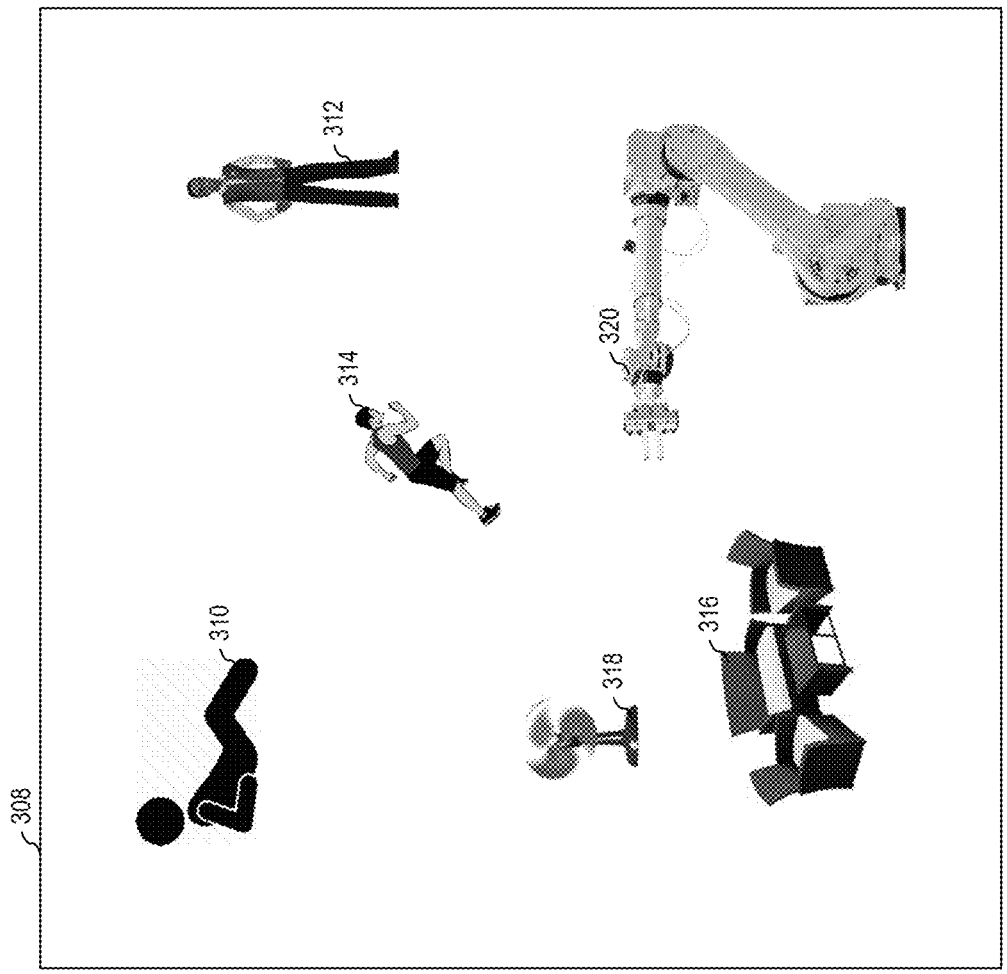
FIG. 3 shows a radar system in an industrial setting, according an embodiment of the present invention.
Figure 3:
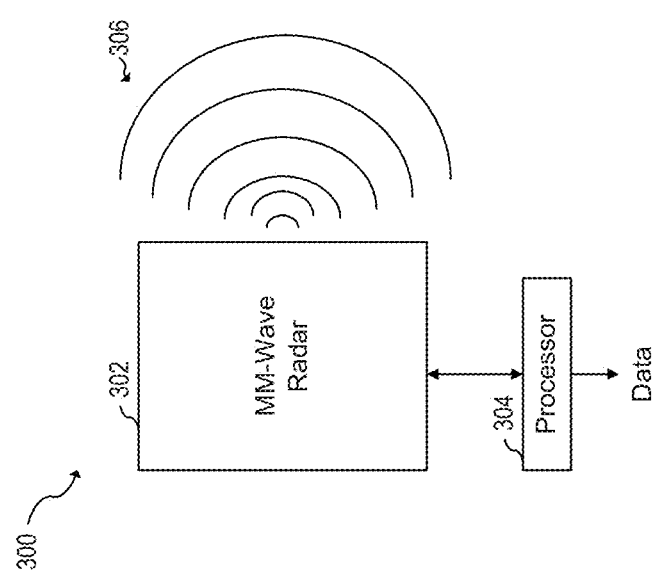

Embodiments of the present invention detect humans (e.g., moving, standing, lying down, etc.) in the presence of clutter (e.g., moving machinery, other moving equipment and static objects) by using a millimeter-wave radar together with signal processing techniques. For example, FIG. 3 shows radar system 300 in an industrial setting, according an embodiment of the present invention. Radar system 300 includes millimeter-wave radar 302 and processor 304.

During normal operation, millimeter-wave radar 302 transmits a plurality of radiation pulses 306, such as chirps, to scene 308. The transmitted radiation pulses 306 are reflected in objects of scene 308. The reflected radiation pulses (not shown in FIG. 3), which are also referred to as the echo signal, are detected by millimeter-wave radar 302 and processed by processor 304 to, for example, identify humans.

The objects in scene 308 may include static humans, such as lying human 310, humans exhibiting low and infrequent motions, such as standing human 312, and moving humans, such as running or walking human 314. The objects in scene 308 may also include static objects, such as furniture 316, periodic movement equipment, such as fan 318, and periodic movement machinery, such as robotic arm 320. Other objects may also be present in scene 308.

Processor 304 analyses the echo data to identify targets (e.g., humans). Processor 304 may also use the echo data to track humans, identify and warn of dangerous conditions and initiate first-aid procedures, such as evacuations, contacting authorities (e.g., fire department or paramedics), stopping machinery, illuminating emergency exits, etc.

Processor 304 may be implemented as a general purpose processor, controller or digital signal processor (DSP). In some embodiments, processor 304 may be implemented as a custom application specific integrated circuit (ASIC). In some embodiments, processor 304 includes a plurality of processors, each having one or more processing cores. In other embodiments, processor 304 includes a single processor having one or more processing cores.

Millimeter-wave radar 302 includes a millimeter-wave radar sensor circuit and an antenna(s). The millimeter-wave radar sensor circuit may be implemented using a two-dimensional millimeter-wave phase-array radar. The millimeter-wave phase-array radar transmits and receives signals in the 20 GHz to 122 GHz range. Alternatively, frequencies outside of this range may also be used. Some embodiments use a single millimeter-wave radar sensor circuit. Other embodiments use a plurality of millimeter-wave radar sensor circuits, the data of which are gathered and processed by processor 304, which may be implemented as a centralized processing device.

In some embodiments, millimeter-wave radar 302 includes a uniform linear array antenna. The echo signals received are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Figure 4:
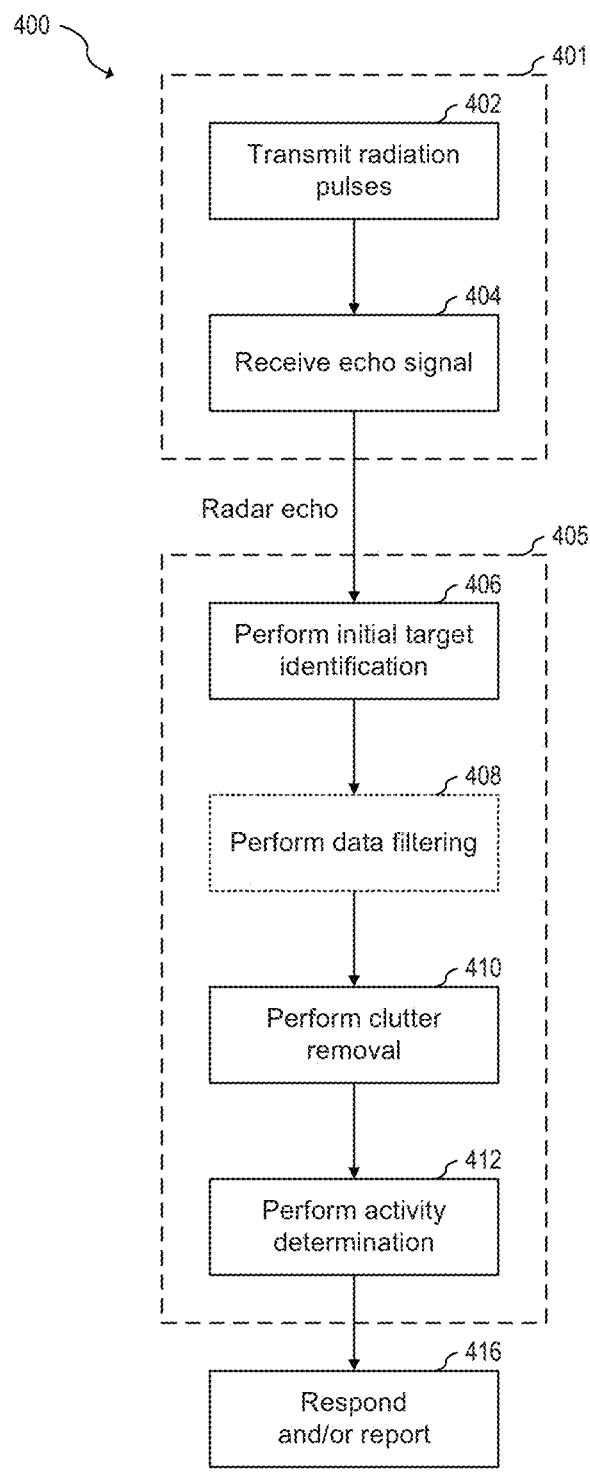
FIG. 4 illustrates a flow chart of an embodiment method of detecting and monitoring humans in an industrial setting, according to an embodiment of the present invention.

FIG. 4 illustrates a flow chart of embodiment method 400 of detecting and monitoring humans in an industrial setting, according to an embodiment of the present invention. Method 400 may be performed, for example, by processor 304.

During step 401, radiation pulses are transmitted, reflected into objects, and received by a radar system, such as millimeter-wave radar 302. Step 401 includes steps 402 and 404. During step 402, a series of radiation pulses, such as chirps, are transmitted toward a scene, such as scene 308. Some embodiments may transmit, for example, 128-256 chirps during a 500 ms period. A different number of chirps (e.g., 16-32 chirps) over a different period (e.g., 1 s or 250 ms) may be transmitted. In some embodiments, the number of chirps transmitted over a predefined period is a power of 2.

In some embodiments, the radiation pulses are transmitted from a single antenna of a single transmitter. In other embodiments, the radiation pulses are transmitted from a plurality of antennas of a single transmitter. In yet other embodiments, the radiation pulses are transmitted from one or more antennas of a plurality of transmitters, each transmitting towards a different view of the scene.

The echo signals, after the radiation pulses are reflected in objects from the scene, are received in step 404. In some embodiments, the echo signals are received in a single antenna of a single receiver. In other embodiments, the echo signals are received by a plurality of antennas of a single receiver. In yet other embodiments, the echo signals are received in one or more antennas of a plurality of receivers, each capturing a different view of the scene.

Data from the echo signals is analyzed (processed) during step 405. Step 405 includes the steps of initial target identification (step 406), data filtering (step 408), clutter removal (step 410) and activity determination (step 412). In some embodiments, steps 408 and 410 may be combined in a single step.

During step 406, an initial target identification is performed. The target identification may be performed, for example, using a range Fast Fourier Transform (FFT). Moving targets, as well as static targets are identified by analyzing the phase information of the echo signals received and comparing the information with a threshold. The threshold applied in this step may be selected to avoid exclusion of the desired targets. Selecting a permissive threshold may result in a high probability of identification of the desired target (e.g., humans). The permissive threshold may also result in the identification as targets of some clutter (e.g., moving machinery, furniture, and other moving equipment).

During step 408, data outliers are removed from the data being analyzed. Such data outliers may be identified using statistical methods, such as by using band pass filtering (e.g., designed with known human activity Doppler limits), for example. Other outlier removal techniques, such as median filtering of intermittent burst of Doppler, may be used.

Step 408 is optional. Some embodiments may perform step 408 together with another step. For example, some embodiments may perform data filtering while performing clutter removal. Other embodiments may perform data filtering before and during clutter removal. Other implementations are also possible.

During step 410, clutter is identified and removed from the data being analyzed. Clutter may be identified, for example, by using Fractional Fourier Transform (FrFT) techniques. For example, humans may be associated with a particular signature, such as a particular time-frequency signature. If a target identified in step 406 exhibits the signature of humans, the target is identified as a human. Otherwise, if the target identified in step 406 does not exhibit the signature of a human, or exhibits the signature of a known non-human object, such target is removed from consideration.

After the human targets are identified from the clutter in step 410, activity determination of the humans is performed in step 412. For example, micro-Doppler (m-D) signature extraction may be performed using short-time fractional Fourier Transform (STFrFT) to determine whether the identified humans are moving, standing, or lying down.

After data from the echo signals is analyzed and humans are identified during step 405, the results are reported during step 416. Reporting the results may include identifying and reporting the number of humans in the scene, their respective states (e.g., standing, walking, lying down, etc.), whether a dangerous condition exists (e.g., a human is too close to a dangerous location), etc. If a dangerous condition is identified (e.g., human lying down, human too close to a dangerous location, etc.), a response may be triggered, such as alerting personal (e.g., factory floor manager) and/or first aid response teams of the condition. Some embodiments may stop one or more machines or take additional actions to address the dangerous condition.

Some embodiments may perform steps 402, 404, 406, 408, 410, and 412 continuously. For example, the transmission of radiation pulses (step 402) and reception of echo signals (step 404) may be performed continuously. Steps 406, 408, 410 and 412 may be performed by analyzing a moving window of data extracted from the received echo signals.

Figure 5A:
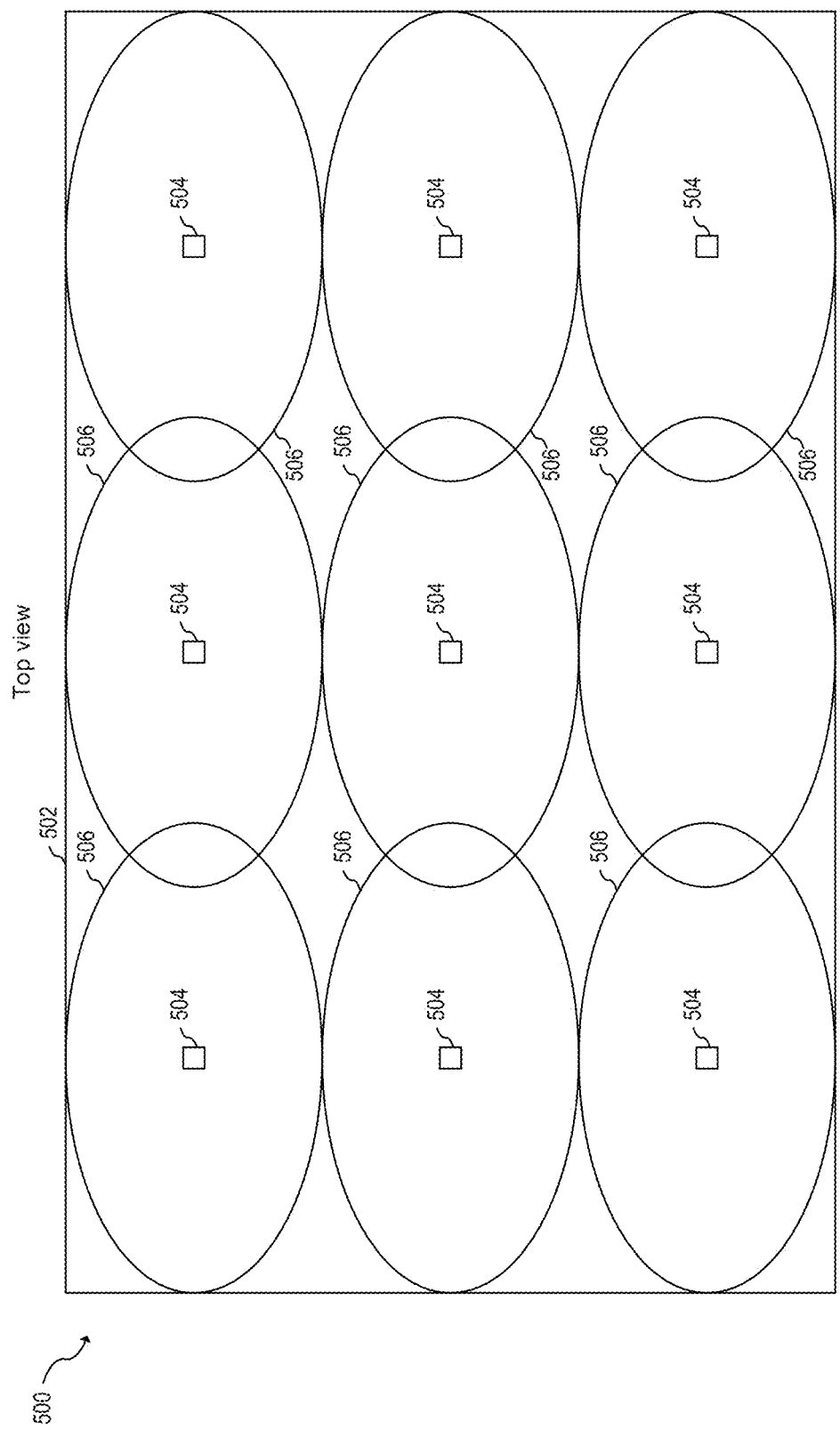
FIG. 5A shows a top view of a radar sensor array, according to an embodiment of the present invention.

Step 401, which includes transmitting radiation pulses (step 402) and receiving the echo signals (step 404) may be implemented with an array of millimeter-wave radar sensor circuits. For example, FIG. 5A shows a top view of radar sensor array 500, according to an embodiment of the present invention. Radar sensor array 500 includes a plurality of millimeter-wave radar sensor circuits 504 distributed to capture scene 502. Each of millimeter-wave radar sensor circuits 504 has field of view 506.

During normal operating, each of millimeter-wave radar sensor circuits 504 transmit radiation pulses (e.g., chirps) and receive the associated echo signals after the radiation pulses are reflected from objects in scene 502. The data generated by each of the millimeter-wave radar sensor circuits 504 is relative to their respective locations in scene 502. The data from each of millimeter-wave radar sensor circuits 504 may be sent to a centralized processor (not shown). The centralized processor may transform the local coordinates into global coordinates. For example, the local coordinates may be transformed into global coordinates by performing the following Householder matrix multiplication:

$$R_x \cdot R_y \quad (1)$$

where $$R_x = \begin{bmatrix} x_0 & 0 & 0 \\ 0 & \cos(\theta_x) & -\sin(\theta_x) \\ 0 & \sin(\theta_x) & \cos(\theta_x) \end{bmatrix} \quad (2)$$

$$R_y = \begin{bmatrix} \cos(\theta_y) & 0 & -\sin(\theta_x) \\ 0 & y_0 & 0 \\ \sin(\theta_x) & 0 & \cos(\theta_x) \end{bmatrix} \quad (3)$$

where $x_o$ and $y_o$ are the translation components along the x and y direction, $\theta_x$ and $\theta_y$ are the rotation about the x axis and y axis, respectively.

As shown in FIG. 5A, some millimeter-wave radar sensor circuits 504 have an area of overlapping field of views 506. The overlapping area may be processed in the centralized processor and the localized images may be stitched together by, for example, using known image stitching techniques. For examples, for overlapping regions, the count of overlaps are first estimated and then used to average the data over such regions.

Advantages of using a plurality of radar sensor circuits include that objects that may not be observable with a field of view of a first radar sensor (e.g., because an object obstructs the view) may be captured by second radar sensor having a different field of view. Some embodiments may select the location of radar sensor circuits to optimize the field of view of the radar sensor array.

Figure 5B:
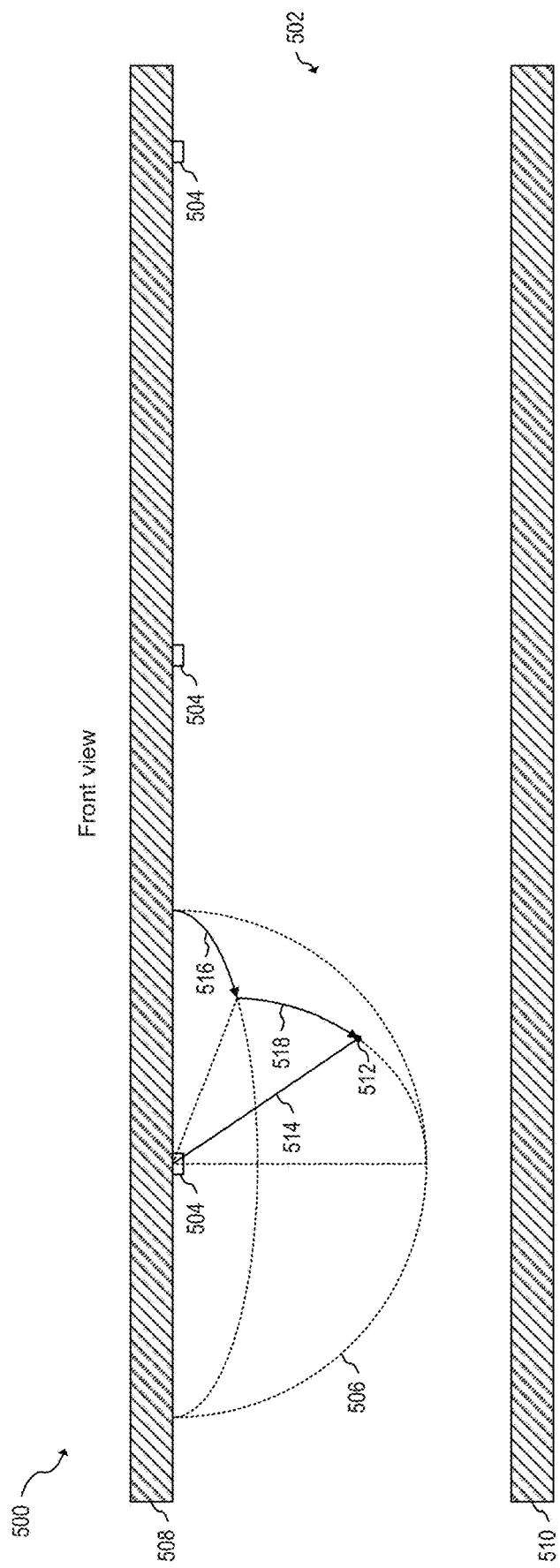
FIG. 5B shows a front view of the radar sensor array of FIG. 5A, according to an embodiment of the present invention.

In some embodiments, millimeter-wave radar sensor circuits 504 may be located at the ceiling of the scene, and location information captured by millimeter-wave radar sensor circuits 504 may be associated with a range, azimuth, and elevation component. For example, FIG. 5B shows a front view of radar sensor array 500, according to an embodiment of the present invention. FIG. 5B illustrates ceiling 508 and floor 510. As shown in FIG. 5B, millimeter-wave radar sensor circuits 504 are located in ceiling 508. Target object 512 is located in scene 502. Millimeter-wave radar sensor circuit 504, for example, may report location information of target object 512 by using elevation component 518, azimuth component 516 and range component 514.

Figure 6:
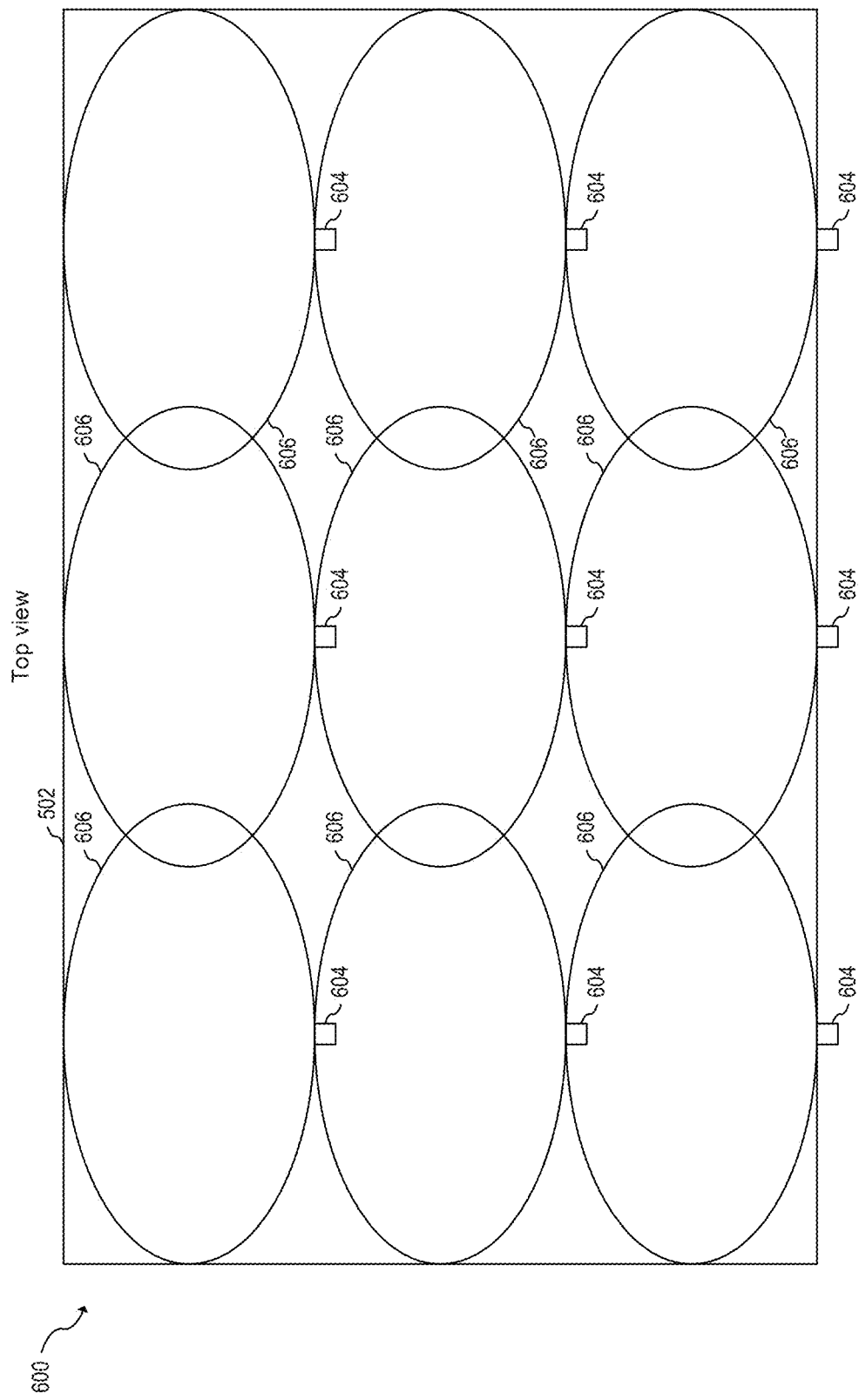
FIG. 6 shows a top view of a radar sensor array, according to another embodiment of the present invention.

Some embodiments may have millimeter-wave radar sensor circuits 504 situated in different locations of the three-dimensional (3D) space and/or with different viewing angles. As another non-limiting example, FIG. 6 shows a top view of radar sensor array 600, according to another embodiment of the present invention. Radar sensor array 600 operates in a similar manner than radar sensor array 500. Radar sensor array 600, however, includes millimeter-wave radar sensor circuits 604, each having respective field of view 606, where field of view 606 is different than field of view 506.

The radar echo has various relevant characteristics, such as signal power, frequency, angle of arrival, time-domain characteristics and noise. One or more of the echo signal characteristics may be affected by objects in the scene (e.g., size, location and material of objects in the scene) and by the behavior of such objects (e.g., direction of movement and velocity of objects in the scene). In some embodiments, M chirps (e.g., identical chirps) are transmitted spaced apart at known intervals (e.g., identical intervals), are received by an array of antennas, sampled by one or more ADCs (e.g., one ADC per antenna), and stored in data structures.

Figure 7B:
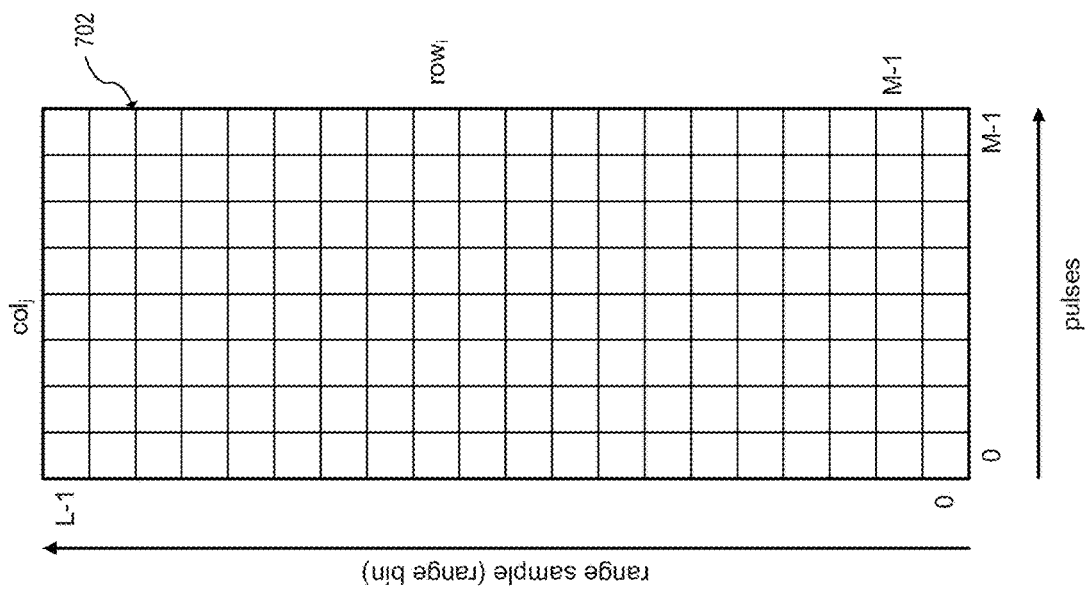
Figure 7A:
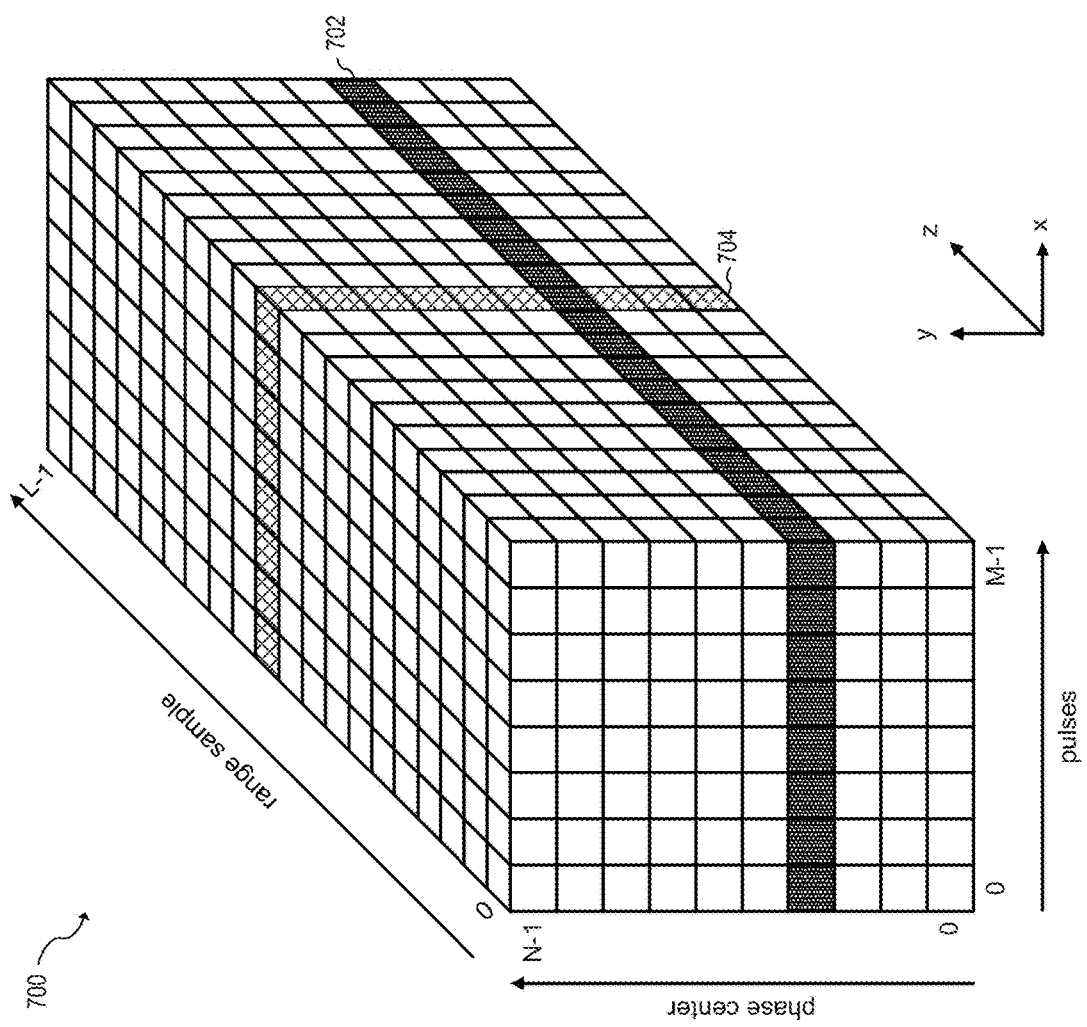

FIG. 7A shows a graphical representation of echo signals 700 captured by millimeter-wave radar 302, according to an embodiment of the present invention. As shown in, captured echo signals 700 include information about M chirps captured by N antennas channels (e.g., an array of N antennas), where each chirp is sampled L times (each chirp has L number of samples). In some embodiments, each sample corresponds to discrete steps in a voltage-controlled oscillator (VCO) spanning the entire bandwidth of the chirp. As shown in FIG. 7A, captured echo signals 700 are illustrated as a 3D datacube, where each of the axes of the datacube represents pulse, phase center, and range, respectively. Each square (i.e., cell) of the datacube represents a complex in-phase and quadrature component (I&Q) sample.

Captured echo signals 700 may be analyzed in different ways. For example, captured echo signals 700 may be analyzed along two-dimensional (2D) slice 702 (also shown in FIG. 7B) and along 2D slice 704 (also shown in FIG. 7D). Data may also be analyzed along different 2D slices, as well as over vectors of different directions. It is understood that there are in this example N 2D slices 702 and L 2D slices 704. It is also understood that although a particular processing step may be described with respect to a particular slice of data (e.g., 2D slice 702), the same processing step may be applied to one or more of the other similar data slices, including all of the other similar slices (e.g., all of the N 2D slices 702).

As shown in FIG. 7A, operations that are applied along the z-axis relate to a single chirp. Operations along the z-axis are referred to as operations performed in fast time. Operations performed along the x-axis relate to a same sample location of a plurality of chirps. Operations along the x-axis are referred to as operations performed in slow time (since they relate to multiple chirps).

Object detection may be performed, for example, by analyzing one or more of 2D slices 702. For example, as shown in FIG. 7B, each of the M chirps is captured in a column of 2D slice 702 (e.g., $col_j$), where each row represent a sample location of the chirps. Each of the rows of 2D slice 702 may be referred to as a range bin. For example, if 16 chirps are transmitted, and each chirp is captured with 512 samples, then M is equal to 16 and L is equal to 512.

If objects are not moving in the field of view associated with the 2D slice 702, phase and amplitude information of cells in a particular row (e.g., $row_i$) will be the same (since each transmitted chirp is identical). Information about range, therefore, may be obtained, for example, based on the amplitude peak of one or more cells of $row_i$. In other words, each range bin along the z-axis corresponds to a fixed distance/range, a target detection of a particular cell(s) represents the target with that range.

If objects are moving, the phase information of each cell across the respective $row_i$ may vary depending on the direction of movement, velocity, etc. In some embodiments, a moving object may be identified based on phase differences captured in slow time. For example, data along a range bin (slow time data) may be filtered (e.g., using a linear filter) and compared with a threshold. A moving target may be detected when the data shows a peak higher than the threshold.

To extract velocity information, a Doppler analysis using the Fourier Transform (e.g., FFT) may be applied to each row of 2D slice 702 to generate matrix 706 of FIG. 7C. As shown in FIG. 7C, matrix 706 has K frequency bins. If a sample of a particular row is greater than a threshold, a target is detected and the corresponding frequency bin is related to the velocity of the detected target. The target is detected in the location corresponding to slice 702 with respect to the datacube (i.e., with respect to the phase center). A similar analysis may be performed using FrFT instead of FFT.

To determine the angle of arrival, 2D slice 704, as shown in FIG. 7D, may be used. The estimation of the angle of arrival of the target detected can be achieved through receiver beamforming. Beamforming may be performed, for example, along the azimuth angle and along the elevation angle. For example, in some embodiments a beam is formed at the transmitter by post processing a plurality of baseband signals based on a plurality of signals received by different receivers or a combination thereof. Implementing beamforming by post processing received baseband signals may allow for the implementation of a low complexity transmitter.

In an embodiment, a millimeter-wave sensor system is used with $N_t=2$ transmit (TX) elements and $N_r=2$ receive (RX) elements arranged in a linear array. Accordingly, there are $N_t \times N_r = 4$ distinct propagation channels from the TX array to the RX array in a linear array configuration for azimuth angle profiling. If the transmitting source (TX channel) of the received signals can be identified at the RX array, a virtual phased array of $N_t \times N_r$ elements can be synthesized with $N_t + N_r$ antenna elements. In various embodiments, a time division multiplexed MIMO array provides a low cost solution to a fully populated antenna aperture capable of near field imaging. In some embodiments, a symmetrical linear arrangement of the TX and the RX elements with some vertical offset between the TX array and the RX array for reduced coupling may be used. Some embodiments may include more than 2 TX elements and/or more than 2 RX elements.

Figure 7E:
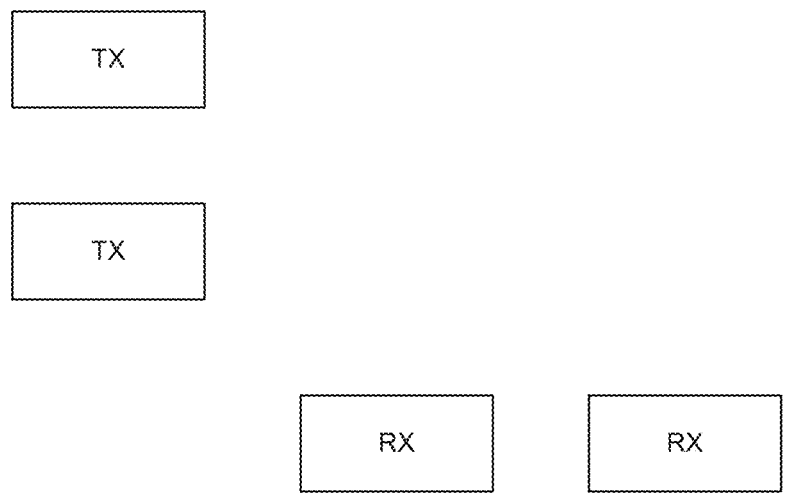
FIG. 7E shows a possible arrangement of TX and RX elements of a millimeter-wave radar sensor circuit.

In some embodiments, the TX and RX elements of the millimeter-wave sensor system may be arranged in an L shape, as shown in FIG. 7E. For example, with respect to FIG. 5B, the TX and RX elements may be disposed in millimeter-wave radar sensor circuits 504 with the arrangement shown in FIG. 7E, where the TX elements illuminates in a direction towards floor 510 and the RX element have a field of view in a direction towards floor 510. Other arrangements are possible.

Figure 7F:
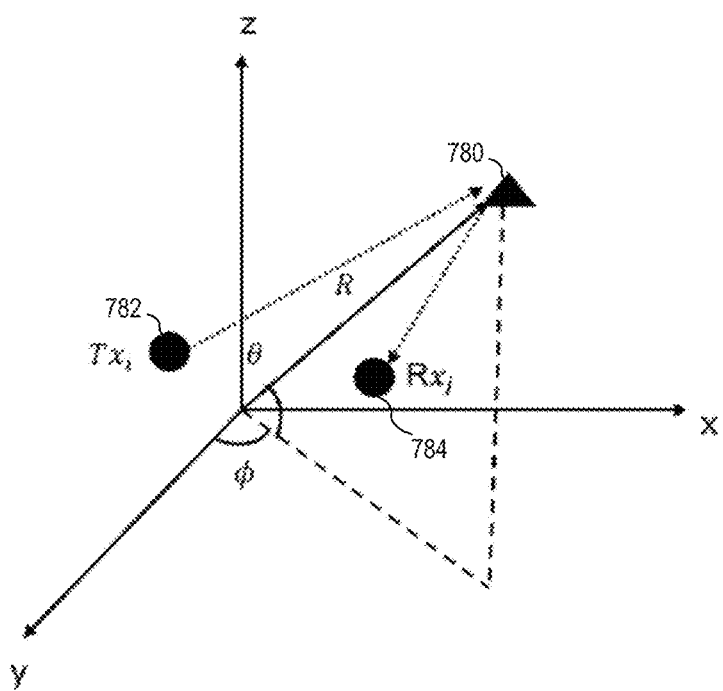
FIG. 7F shows a graphical representation of beamforming, according to an embodiment of the present invention.

FIG. 7F shows a coordinate axes used to illustrate an embodiment algorithm. As shown FIG. 7F illustrates the position of target 780, transmit (TX) antenna element 782 and receive (RX) antenna element 784. The position r of target 780 can be represented as $$r=[R\cos(\theta)\sin(\theta); R\cos(\theta)\cos(\theta); R\sin(\theta)]$$

where R is the distance from the origin to target 780. The directional vector u of target 780 can be expressed as $$u=[\cos(\theta)\sin(\theta);\ \cos(\theta)\cos(\theta);\ \sin(\theta)].$$

Denoting the 3D positional coordinates of the TX antenna element as $d_i^{Tx}$, i=1, 2 and the RX antenna element as $d_j^{Rx}$, j=1, 2 in space, then on assuming far field conditions, the signal propagation from a TX element $d_i^{Tx}$ to target 780 (assumed to be a point scatterer) and subsequently the reflection from target 780 to Rx antenna element $d_j^{Rx}$ can be approximated as $2*x+d_{ij}$, where x is the based distance of target 780 to the center of the virtual linear array, and $d_{ij}$ refers to the position of the virtual element to the center of the array.

The transmit steering vector may be written as:

$$a_i^{Tx}(\theta, \phi) = \exp\left(-j2\pi \frac{d_i^{Tx} u(\theta, \phi)}{\lambda}\right); i = 1, 2$$

and the receiving steering vector may be expressed as:

$$a_j^{Rx}(\theta, \phi) = \exp\left(-j2\pi \frac{d_j^{Rx} u(\theta, \phi)}{\lambda}\right); j = 1, 2$$

where λ is the wavelength of the transmit signal. A joint TX and RX steering vector $a(\theta,\phi)$ can be derived as the Kronecker of the transmit and receive steering vectors (assuming i=j=1):

$$a(\theta,\phi)=a_i^{Tx}(\theta,\phi) \otimes a_j^{Rx}(\theta,\phi); i=j=1$$

From the joint steering vector, the following beamspace spectrum may be computed from which angles θ and φ may be estimated according to a minimum variance distortionless response (MVDR) algorithm:

$$P(\theta, \phi) = \frac{a(\theta, \phi)^H a(\theta, \phi)}{a(\theta, \phi)^H C a(\theta, \phi)}$$

In the above expression, $C=E\{x(r,d)x(r,d)^H\}$ is calculated as a covariance matrix, where $E\{.\}$ is the expectation operator. The above covariance matrix may be estimated as sample matrix indicator as $$C = \frac{1}{N}\sum_{n=1}^{N} x_i(r, d) x_i(r, d)^H$$

where $x_i(r,d)$ represents measured range, Doppler data (r,d).

In an embodiment of the present invention, humans are detected in a factory setting by tracking before detecting identified targets. A range FFT is performed on the echo of a radar to identify initial static and moving targets. A FrFT is performed with an optimal angle α to improve signal to clutter ratio (SCR). Identified targets are clustered and tracked. The tracked clusters are compared with reference signatures to further improve SCR. Humans are detected based on the tracked clusters. An activity determination on the detected humans is performed using short-time fractional Fourier transform (STFrFT) and micro-Doppler (m-D) extraction and detection. The signal to clutter ratio (SCR) is further improved periodically updating the angle α.

Figure 8:
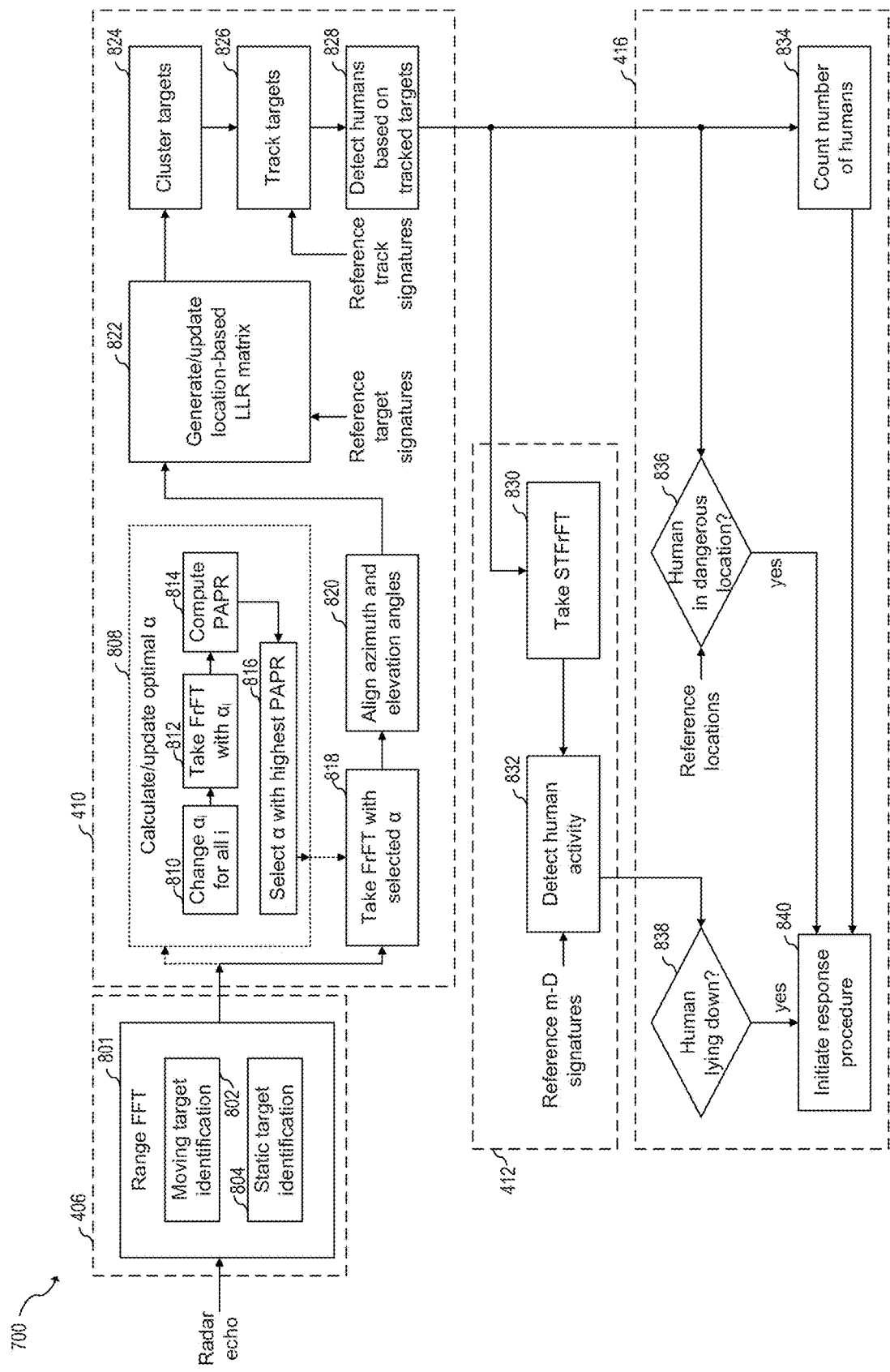
FIG. 8 illustrates a flow chart of an embodiment method of detecting and monitoring humans in an industrial setting, according to an embodiment of the present invention.

FIG. 8 illustrates a flow chart of embodiment method 800 of detecting and monitoring humans in an industrial setting, according to an embodiment of the present invention. Method 800 is a possible implementation of a portion of method 400. Method 800 may be performed, for example, by processor 304.

During normal operation, a radar echo signal is received, such as described with respect to step 401 of FIG. 4. The radar echo signal may include, for example, a frame of data having 8 to 16 chirps captured with antennas of a radar sensor array, such as described with respect to FIG. 7A. Some embodiments may use a different number of captured chirps (e.g., 32, 64, etc.). In some embodiments, the number of chirps may be a power of 2.

A 2×2 radar sensor array may be used to capture the radar echo signal. A radar sensor having a different dimension, such as a 3×3, 3×2, 4×2, etc., are also possible. Some embodiments may have a single radar sensor instead of a radar sensor array.

The frame of data may be generated by an ADC (not shown). The ADC (not shown) may generate, for example 512 samples per chirp. A different number of samples per chirp, such as 128 or 256, are also possible.

After receiving the echo signal, an initial target identification step (step 406) is performed. Step 406 includes performing a range FFT (step 801) which identifies initial moving target (step 802) and initial static target (step 804). Step 802 may be carried out, for example, as described with respect to FIGS. 7A and 7C. Step 804 may be carried out, for example, as described with respect to FIGS. 7A and 7B. During step 801, potential targets (either static or moving) are identified, with their corresponding range bins. In some embodiments, a filtering step is also performed during step 406 to remove outlier targets.

The thresholds for determining moving target identification and static target identification are selected to allow for the detection of all human targets, even though some clutter may also be detected as targets. Step 410 is performed to remove the clutter from the detected targets.

During step 410, the FrFT is used on the data associated with the targets identified during step 801. For any real angle α (not to be confused with the angle of arrival used during beamforming), the FrFT of a signal s(t) is given by:

$$\begin{cases} \left(\frac{1-j\cot(\alpha)}{2\pi}\right)^{\frac{1}{2}} \cdot e^{j\frac{t^2}{2} \cdot \cot(\alpha)} \cdot \\ \int_{-\infty}^{\infty} s(t) \cdot e^{j\frac{t^2}{2} \cdot \cot(\alpha)} \cdot e^{-j u t \csc(\alpha)} \cdot dt; \text{ for } (\alpha \neq n\pi) \\ s(u); \text{ for } (\alpha = n2\pi) \\ s(-u); \text{ for } (\alpha + \pi = n2\pi) \end{cases} \quad (4)$$

where n is an integer. The FrFT may be interpreted as a rotation of the time-frequency plane by the angle α. For example, when α=0, the FrFT is the identity operator and results in the time domain signal. When $$\alpha = \frac{\pi}{2},$$

the FrFT is equivalent to the Fourier Transform. When $$\alpha = \left(0 : \frac{\pi}{2}\right),$$

the FrFT provides a representation of the signal in a time-frequency plane.

The fractional Fourier spectrum of a signal may be highly concentrated in a fractional frequency. The centroid of a linear frequency modulated (LFM) signal may be determined by the location of the signal's energy peak in the fractional Fourier frequency. Therefore, by selecting an appropriate rotational angle (i.e., angle α), the LFM signals generated by moving targets may be detected.

During step 808, which may also be referred to as a calibration step, a search for an optimal angle α is performed. Step 808 includes steps 810, 812, 814 and 816. During step 810, a plurality of angles $\alpha_i$ are evaluated, where i may be, for example, 10. For each angle $\alpha_i$ the FrFT is computed, as shown in step 812. The FrFT may be performed on 2D slice 702 in a similar manner as an FFT is applied to 2D slice 702 to generate 2D slice 706. The energy of a plurality of local peaks (e.g., 5 to 10 local peaks) of each FrFT of each angle $\alpha_i$ is computed and compared with the average energy of the respective FrFT to generate a peak to average power ratio (PAPR) metric for each angle $\alpha_i$. After evaluating all angle $\alpha_i$ for all i, the angle $\alpha_i$ with the highest PAPR is selected for further processing during step 816. In some embodiments, the selected angle $\alpha_i$ is used to evaluate all 2D slices in subsequent steps. In some embodiments, step 808 is performed every 5 to 10 seconds. Other intervals may be used. When step 808 is not performed, the previously selected angle α is used in step 818.

Using multiple local peaks to generate the PAPR metric increases the probability that the identified targets include all humans present. Using multiple local peaks also increases the probability of identifying clutter as targets. To minimize detection of clutter, local peaks that are identified as non-humans may be removed from consideration. For example, if a local peak corresponds to an elevation higher than that of a human (e.g., an elevation higher than 7 ft), the local peak is removed from consideration in the PAPR computation. In other words, the local peak is not considered as part of the "peak" but is considered as part of the "average" in the PAPR computation. Other conditions, such as locations (e.g., with respect to range and azimuth angles) where humans cannot be present can be used to remove local peaks from consideration.

Step 808 selects the optimal angle α by using the PAPR, as shown in steps 810, 812, 814, and 816. Other ways of selecting an optimal angle α are also possible. For example, in some embodiments, the optimal angle α is selected by counting the number of peaks in a neighborhood and selecting the angle α with fewest distinct peaks in a neighborhood of range/Doppler.

During step 818, a FrFT is performed using the selected angle α. The FrFT may be performed on 2D slice 702 in a similar manner as an FFT is applied to 2D slice 702 to generate 2D slice 706. The FrFT may be performed only on the range bins where potential targets were identified during step 801. Targets are identified by comparing the peaks of the FrFT with a threshold. The velocity of the identified moving target may be extracted based on the FrFT bin location associated with the respective peak.

The locations of the identified targets and direction of movements are determined using, for example, beamforming techniques during step 820. For example beamforming may be performed for the elevation angle and the azimuth angle, as described with respect to FIG. 7F.

A log-likelihood ratio (LLR) of each range, Doppler (e.g., velocity), azimuth and elevation component is generated during step 822. In other words, a probability that a target is present in each of the locations scanned is determined during step 822. The probability is determined based on predetermined reference target signatures. For example, peaks associated with non-human behaviors or locations may be discarded or associated with a very low probability. Similarly, peaks associated with a velocity of movement that is higher than human movement (e.g., higher than 12 m/s) and having repetitive Doppler patterns may be associated with a very low probability (e.g., 0%). In contrast, peaks associated with human behavior or not associated with non-human behavior may be associated with a higher probability (e.g., 70%). As another example, if a static object is identified in a location where a known non-movable furniture is located, a low probability (e.g., 0%) may be assigned to that location. The reference target signatures may be determined, for example, using machine learning algorithms such as a random forest algorithm.

Identified targets are clustered during step 824. For example, locations associated with a probability higher than, e.g., 50%, that are adjacent to each other are clustered together because there is a high probability that they originate from the same target. The center of the energy in a cluster may be associated with the center (centroid) of the identified cluster, where the cluster is the union of all the points within a neighborhood. A location or cluster associated with an identified target is also referred to as a hit.

Identified clusters are tracked over time during step 826. Clusters may be associated with tracks, for example, by using a nearest neighbor method.

Some of the identified tracks may be associated with clutter while other identified clusters may be associated with humans. Distinguishing between clutter clusters and human clusters may be performed by comparing the tracked cluster behavior with reference track signatures. For example, some moving parts of machinery may show up as hits when a particular angle α is used during step 818 but may not show up as hits when a different angle α is used during step 818. Since the angle α is periodically updated during calibration step 808, such moving parts of the machinery may be detected as hit during a first time, and may not be detected as a hit during a second time. The appearing and disappearing of a cluster may be associated with a track signature, and if a cluster appears and disappears periodically, it may be detected by comparing the tracked behavior with the reference track signature and may be discarded. The reference track signatures may be determined, for example, using machine learning algorithms such as a random forest algorithm.

In some embodiments, a probability density function (pdf) $p(S_k|Z_k)$ of each identified cluster is generated during step 826, where $Z_k$ contains all the measurements up to time k. An estimate $\overline{S_k}$ of the next state of the identified cluster is made, which contains information such as position, velocity, and acceleration. The state $S_k$ may correspond to human or non-human.

If a track is associated with human behavior for at least a predetermined time, such as 30 seconds, the track is associated with a human, and a human is detected during step 828.

For each cluster identified as a human, an activity determination is performed during step 412. For example, micro-Doppler (m-D) signature extraction may be performed on each cluster identified as a human by performing a STFrFT on, e.g., a 2D slice 702, during step 830. During step 830, the entire Doppler axis may be passed to a classifier for detecting human activity during step 832. The extracted m-D signatures are compared with reference m-D signatures to determine (classifies) for example, whether the human is standing, walking or lying down using, e.g., a random forest algorithm, during step 838. The reference m-D signatures may be determined, for example, using machine learning algorithms such as a random forest algorithm.

The references m-D signatures may be extracted in a controlled environment (e.g., an anechoic chamber) for the activities to be classified (e.g., standing, walking and lying down) and used to train the classifier offline. The trained classifier/model is then used for classifying activities during step 838. The use of a classifier such as described allowed for proper classifications in noisy environments.

During step 416, results from the human identification, detection and tracking may be reported. For example, processor 304 may report the number of humans detected, the locations of each detect human, and the activities being performed by each detected human. Historical data of each detected humans may also be reported, such as location tracking of the humans, time each human has been present in the scene, etc.

The number of humans is counted during step 834. In some embodiments, the number of humans is based on the number of tracks that are associated with humans during step 828. For example, if 5 tracks are associated with humans, then the human count is equal to 5. If a track is terminated (e.g., because a human exits the scene) or if a track is no longer associated with a human, the human counts is updated to reflect the number of tracks associated with humans during step 834.

During step 416, processor 304 may respond to a detected trigger condition. For example, during step 836, the location of a human cluster is compared with reference locations. If the location of the human cluster overlaps with a reference location, response procedure step 840 is executed. As another example, during step 838, if a human cluster is determined to be lying down, response procedure step 840 is executed. Other activities and other trigger events may result in the execution of response procedure step 840.

Response procedure step 840 may include various response procedures, such as, for example, alerting personal (e.g., factory floor manager), and/or alerting first aid response teams of the condition, triggering an evacuation, and stopping or shutting down one or more machines. Other response procedures are also possible.

The particular response procedure executed may depend on the trigger of the response procedure. For example, a human lying down may trigger an alerting personal procedure. As another example, a human in a dangerous location may trigger the shutdown of a machine associated with the dangerous location.

When an evacuation is triggered, processor 304 may track the number of humans as each evacuate the area. Processor 304 may alert first aid personal if humans did not leave the area in a predetermined time. In some embodiments, first aid personal may be alerted during an evacuation of a human cluster is associated with a human lying down. Other actions are also possible.

Advantages of some embodiments include the detection of humans in noisy environments, such as a factory setting, where moving machinery, static objects, humans and other moving equipment coexist. By detecting, monitoring, and/or counting human beings, casualties/injuries may be prevented. Other advantages include the improvement of SCR by using track before detect techniques and dynamic optimal angle alpha selection.

Figure 9:
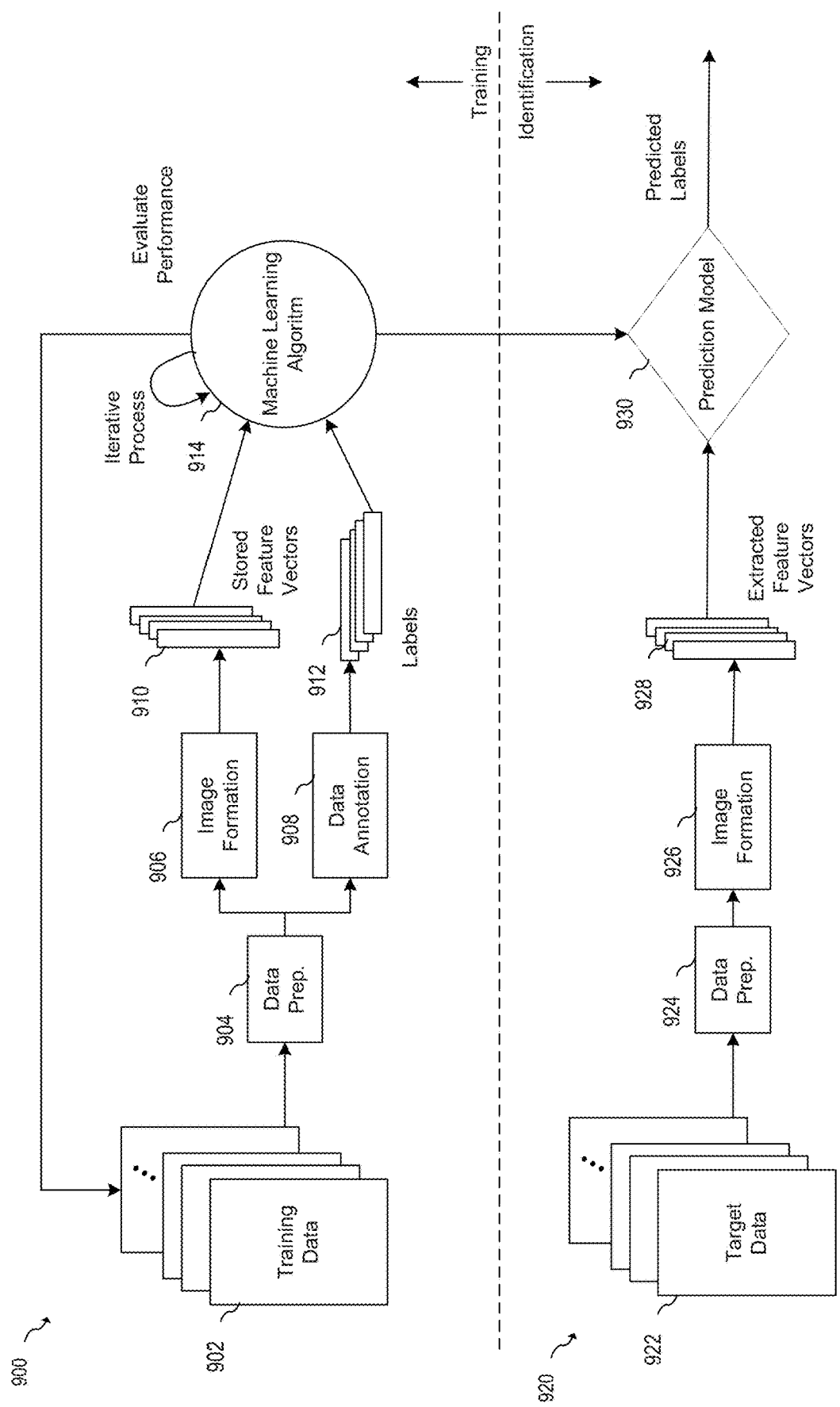
FIG. 9 illustrates a block diagram showing a machine learning pipeline for feature extraction and identification.

FIG. 9 illustrates a block diagram showing a machine learning pipeline for machine language based feature extraction and identification that can be used to generate reference signatures (reference target signatures, reference track signatures, and reference m-D signatures) to classify the target (step 822), tracks (step 826), and human activity (step 832). The top portion 900 of FIG. 9 is devoted to the processing storage of features for comparison to later measurements. The data and steps shown in this portion represent the actions performed when radar measurements are performed and processed for a classification category. The bottom portion 920 is devoted to the processing and comparison of new measurements for comparison to stored data. These data and steps represent the actions performed when the system is identifying and detecting humans and human activity. Portion 900 is applicable for the generation of reference target signatures, reference track signatures and reference m-D signatures. Portion 920 is applicable to classification steps 822, 826 and 832.

As shown in the top portion 900 of FIG. 9, training data 902 is transformed into stored feature vectors 910 and corresponding labels 912. Training data 902 represents the raw data (e.g., echo). Feature vectors 910 represent sets of generated vectors that are representative of the training data 902. Labels 912 represent user metadata associated with the corresponding training data 902 and feature vectors 910.

As shown, training data 902 is transformed into feature vectors 910 using image formation algorithms. Data preparation block 904 represents the initial formatting of raw sensor data, and data annotation block 908 represents the status identification from training data 902.

During operation, one or more radar images are taken of a controlled environment that includes one or more static and moving targets (e.g., humans, moving machinery, furniture, and other moving equipment) using millimeter-wave sensors described above. In some cases, multiple radar images are recorded to increase the accuracy of identification. Machine learning algorithm 914 evaluates the ability of a prediction model 930 to identify feature vectors and iteratively updates training data 902 to increase the classification accuracy of the algorithm. The training performance of the machine learning algorithm may be determined by calculating the cross-entropy performance. In some embodiments, the machine learning algorithm 914 iteratively adjusts image formation parameters for a classification accuracy of at least 90%. Alternatively, other classification accuracies could be used.

Machine learning algorithm 914 may be implemented using a variety of machine learning algorithms known in the art. For example, a random forest algorithm or neural network algorithm, such as a ResNet-18 or other neural network algorithm known in the art, may be used for classification and analysis of stored feature vectors 910. During the iterative optimization of stored feature vectors 910, a number of parameters of image formation 906 may be updated.

Once the system has been trained using reference training data 902, the reference signatures may be used for classification during normal operation. During normal operation, new target data 922 is received. Data preparation block 924 prepares the new target data 922 for image formation, and image formation block 926 forms new extracted feature vectors 928. Prediction model 930 utilizes machine learning algorithm 914 to match new extracted feature vectors 928 to a stored feature vector 910. When a match is identified, a predicted label is provided that identifies the new feature vector. In some embodiments, data from the stored labels 912 is provided as a predicted label. Prediction model 930 may be a machine learning model with optimal parameters computed/evaluated through a machine learning algorithm.

Example embodiments of the present invention are summarized here. Other embodiments can also be understood from the entirety of the specification and the claims filed herein.

Example 1

A method for human detection, the method including: transmitting a plurality of chirps towards objects of a scene using a millimeter-wave radar to produce echo signals; receiving a first echo signal using the millimeter-wave radar to produce a first set of data; identifying first initial targets based on the first set of data; selecting a first angle based on the first set of data; performing a Fractional Fourier Transform (FrFT) on the first set of data based on the first initial targets using the first angle; identifying first targets by comparing peaks of the FrFT of the first set of data with a first threshold; after receiving the first echo signal, receiving a second echo signal using the millimeter-wave radar to produce a second set of data; identifying second initial targets based on the second set of data; selecting a second angle based on the second set of data, where the second angle is different from the first angle; performing a FrFT on the second set of data based on the second initial targets using the second angle; identifying second targets by comparing peaks of the FrFT of the second set of data with the first threshold; generating a set of target tracks based on the identified first and second targets; comparing each target track of the set of target tracks with a set of reference track signatures to generate a respective target track comparison result; and associating a target track with a human track based on the respective target track comparison result.

Example 2

The method of example 1, further including counting a number of humans in the scene by counting a number of target tracks associated with a human track.

Example 3

The method of one of examples 1 or 2, where the scene includes a factory setting having moving machinery.

Example 4

The method of one of examples 1 to 3, where transmitting the plurality of chirps includes continuously transmitting 128 to 256 chirps every 500 ms.

Example 5

The method of one of examples 1 to 4, where transmitting the plurality of chirps includes transmitting chirps equally spaced apart in time.

Example 6

The method of claim 1, further including: updating a location-based probability matrix based on the identified first and second targets; detecting a human per human track; performing a short-time FrFT (STFrFT) on the second set of data to generate a first STFrFT data set; and determining respective states of detected humans using micro-Doppler measurements based on the first STFrFT data set and the location-based probability matrix.

Example 7

The method of one of examples 1 to 6, further including generating an alert when at least one detected human has a state associated with lying down.

Example 8

The method of one of examples 1 to 7, where states associated with detected humans comprise: lying down, standing, and walking.

Example 9

The method of one of examples 1 to 8, where determining respective states of detected humans based on the first STFrFT data includes comparing the first STFrFT data with reference activity signatures.

Example 10

The method of one of examples 1 to 9, further including: triggering an evacuation based on the determined states of detected humans; and tracking a number of humans in the scene during the evacuation.

Example 11

The method of one of examples 1 to 10, further including generating the reference activity signatures using a machine learning algorithm.

Example 12

The method of one of examples 1 to 11, where the millimeter-wave radar includes an array of millimeter-wave radar sensor circuits, where each millimeter-wave radar sensor captures a different field of view.

Example 13

The method of one of examples 1 to 12, further including stitching respective captured fields of view of each millimeter-wave radar sensor circuits to generate a stitched data set, where the first set of data and the second set of data are stitched data sets.

Example 14

The method of one of examples 1 to 13, further including identifying static objects based on the first set of data.

Example 15

The method of one of examples 1 to 14, where identifying first initial targets includes performing a range Fast Fourier Transform (FFT) on the first set of data.

Example 16

The method of one of examples 1 to 15, where selecting the first angle includes: performing a plurality of FrFTs on the first set of data using a respective plurality of different angles; and for each FrFT of the plurality of FrFTs, computing a peak to average power ratio (PAPR), where an angle of the plurality of different angles associated with a highest PAPR is selected as the first angle.

Example 17

The method of one of examples 1 to 16, where computing the PAPR includes: identifying five or more local peaks of a respective FrFT; and computing the PAPR by comparing energy of the identified five or more local peaks with average energy of the respective FrFT.

Example 18

The method of one of examples 1 to 17, where selecting the second angle includes: performing a second plurality of FrFTs on the second set of data using a respective second plurality of different angles; and for each FrFT of the second plurality of FrFTs, computing a PAPR, where an angle of the second plurality of different angles associated with a highest PAPR is selected as the second angle.

Example 19

The method of one of examples 1 to 18, further including: updating a location-based probability matrix based on the identified first targets; and determining an angle of arrival of the first echo signal by performing beamforming on the first set of data, where updating the location-based probability matrix is based on the beamforming.

Example 20

The method of one of examples 1 to 19, further including clustering targets based on a location-based probability matrix using a nearest neighbor algorithm, where the location-based probability matrix is updated based on identified first and second targets, and where generating the set of target tracks includes tracking the clustered targets.

Example 21

The method of one of examples 1 to 20, where each target track of the set of target tracks includes location information over time.

Example 22

A system including: a processor configured to be coupled to a millimeter-wave radar sensor circuit, the processor configured to: receive from the millimeter-wave radar sensor circuit a first set of data and a second set of data; identify first initial targets based on the first set of data; select a first angle based on the first set of data; perform a Fractional Fourier Transform (FrFT) on the first set of data based on the first initial targets using the first angle; identify first targets by comparing peaks of the FrFT of the first set of data with a first threshold; select a second angle based on the second set of data, where the second angle is different from the first angle; identify second initial targets based on the second set of data; perform a FrFT on the second set of data based on the second initial targets using the second angle; identify second targets by comparing peaks of the FrFT of the second set of data with the first threshold; track identified targets based on the identified first and second targets; and compare the tracked identified targets with reference track signatures to detect humans.

Example 23

The system of example 22, where tracking identified targets includes generating a set of target tracks based on a location-based probability matrix, where each target track of the set of target tracks includes location information over time, and where comparing the tracked targets with reference track signatures includes: comparing each target track of the set of target tracks with a set of reference track signatures to generate a respective target track comparison result, and associating a target track with a human track based on the respective target track comparison result.

Example 24

A millimeter-wave radar including: a millimeter-wave radar sensor circuit configured to: continuously transmit a plurality of chirps towards objects of a scene to produce echo signals, receive a first echo signal using the millimeter-wave radar to produce a first set of data, and after receiving the first echo signal, receive a second echo signal to produce a second set of data; and a processor configured to: select a first angle based on the first set of data, perform a Fractional Fourier Transform (FrFT) on the first set of data using the first angle, identify first targets by comparing peaks of the FrFT of the first set of data with a first threshold, select a second angle based on the second set of data, where the second angle is different from the first angle, perform a FrFT on the second set of data using the second angle, identify second targets by comparing peaks of the FrFT of the second set of data with the first threshold, track identified targets based on the identified first and second targets, and compare the tracked identified targets with reference track signatures to detect humans.

Example 25

The radar of example 24, further including a plurality of millimeter-wave radar sensor circuits disposed in a ceiling of the scene, where the processor is further configured to stitch respective captured fields of view of each millimeter-wave radar sensor circuits of the plurality of millimeter-wave radar sensor circuits to generate a stitched data set.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for human detection, the method comprising:
    transmitting a plurality of chirps towards objects of a scene using a millimeter-wave radar to produce echo signals;
    receiving a first echo signal using the millimeter-wave radar to produce a first set of data;
    identifying first initial targets based on the first set of data;
    selecting a first angle based on the first set of data;
    performing a Fractional Fourier Transform (FrFT) on the first set of data based on the first initial targets using the first angle;
    identifying first targets by comparing peaks of the FrFT of the first set of data with a first threshold;
    after receiving the first echo signal, receiving a second echo signal using the millimeter-wave radar to produce a second set of data;
    identifying second initial targets based on the second set of data;
    selecting a second angle based on the second set of data, wherein the second angle is different from the first angle;
    performing a FrFT on the second set of data based on the second initial targets using the second angle;
    identifying second targets by comparing peaks of the FrFT of the second set of data with the first threshold;
    generating a set of target tracks based on the identified first and second targets;
    comparing each target track of the set of target tracks with a set of reference track signatures to generate a respective target track comparison result; and
    associating a target track with a human track based on the respective target track comparison result.

2. The method of claim 1, further comprising counting a number of humans in the scene by counting a number of target tracks associated with a human track.

3. The method of claim 1, wherein the scene comprises a factory setting having moving machinery.

4. The method of claim 1, wherein transmitting the plurality of chirps comprises continuously transmitting 128 to 256 chirps every 500 ms.

5. The method of claim 1, wherein transmitting the plurality of chirps comprises transmitting chirps equally spaced apart in time.

6. The method of claim 1, further comprising:
    updating a location-based probability matrix based on the identified first and second targets;
    detecting a human per human track;
    performing a short-time FrFT (STFrFT) on the second set of data to generate a first STFrFT data set; and
    determining respective states of detected humans using micro-Doppler measurements based on the first STFrFT data set and the location-based probability matrix.

7. The method of claim 6, further comprising generating an alert when at least one detected human has a state associated with lying down.

8. The method of claim 6, wherein states associated with detected humans comprise: lying down, standing, and walking.

9. The method of claim 6, wherein determining respective states of detected humans based on the first STFrFT data comprises comparing the first STFrFT data with reference activity signatures.

10. The method of claim 9, further comprising:
    triggering an evacuation based on the determined states of detected humans; and
    tracking a number of humans in the scene during the evacuation.

11. The method of claim 9, further comprising generating the reference activity signatures using a machine learning algorithm.

12. The method of claim 1, wherein the millimeter-wave radar comprises an array of millimeter-wave radar sensor circuits, wherein each millimeter-wave radar sensor captures a different field of view.

13. The method of claim 12, further comprising stitching respective captured fields of view of each millimeter-wave radar sensor circuits to generate a stitched data set, wherein the first set of data and the second set of data are stitched data sets.

14. The method of claim 1, further comprising identifying static objects based on the first set of data.

15. The method of claim 1, wherein identifying first initial targets comprises performing a range Fast Fourier Transform (FFT) on the first set of data.

16. The method of claim 1, wherein selecting the first angle comprises:
    performing a plurality of FrFTs on the first set of data using a respective plurality of different angles; and for each FrFT of the plurality of FrFTs, computing a peak to average power ratio (PAPR), wherein an angle of the plurality of different angles associated with a highest PAPR is selected as the first angle.

17. The method of claim 16, wherein computing the PAPR comprises:
identifying five or more local peaks of a respective FrFT; and
computing the PAPR by comparing energy of the identified five or more local peaks with average energy of the respective FrFT.

18. The method of claim 16, wherein selecting the second angle comprises:
performing a second plurality of FrFTs on the second set of data using a respective second plurality of different angles; and
for each FrFT of the second plurality of FrFTs, computing a PAPR, wherein an angle of the second plurality of different angles associated with a highest PAPR is selected as the second angle.

19. The method of claim 1, further comprising:
updating a location-based probability matrix based on the identified first targets; and
determining an angle of arrival of the first echo signal by performing beamforming on the first set of data, wherein updating the location-based probability matrix is based on the beamforming.

20. The method of claim 1, further comprising clustering targets based on a location-based probability matrix using a nearest neighbor algorithm, wherein the location-based probability matrix is updated based on identified first and second targets, and wherein generating the set of target tracks comprises tracking the clustered targets.

21. The method of claim 1, wherein each target track of the set of target tracks comprises location information over time.

22. A system comprising:
a processor configured to be coupled to a millimeter-wave radar sensor circuit, the processor configured to:
receive from the millimeter-wave radar sensor circuit a first set of data and a second set of data;
identify first initial targets based on the first set of data;
select a first angle based on the first set of data;
perform a Fractional Fourier Transform (FrFT) on the first set of data based on the first initial targets using the first angle;
identify first targets by comparing peaks of the FrFT of the first set of data with a first threshold;
select a second angle based on the second set of data, wherein the second angle is different from the first angle;
identify second initial targets based on the second set of data;
perform a FrFT on the second set of data based on the second initial targets using the second angle;
identify second targets by comparing peaks of the FrFT of the second set of data with the first threshold;
track identified targets based on the identified first and second targets; and
compare the tracked identified targets with reference track signatures to detect humans.

23. The system of claim 22, wherein tracking identified targets comprises generating a set of target tracks based on a location-based probability matrix, wherein each target track of the set of target tracks comprises location information over time, and wherein comparing the tracked targets with reference track signatures comprises:
comparing each target track of the set of target tracks with a set of reference track signatures to generate a respective target track comparison result, and
associating a target track with a human track based on the respective target track comparison result.

24. A millimeter-wave radar comprising:
a millimeter-wave radar sensor circuit configured to:
continuously transmit a plurality of chirps towards objects of a scene to produce echo signals,
receive a first echo signal using the millimeter-wave radar to produce a first set of data, and
after receiving the first echo signal, receive a second echo signal to produce a second set of data; and
a processor configured to:
select a first angle based on the first set of data,
perform a Fractional Fourier Transform (FrFT) on the first set of data using the first angle,
identify first targets by comparing peaks of the FrFT of the first set of data with a first threshold,
select a second angle based on the second set of data, wherein the second angle is different from the first angle,
perform a FrFT on the second set of data using the second angle,
identify second targets by comparing peaks of the FrFT of the second set of data with the first threshold,
track identified targets based on the identified first and second targets, and
compare the tracked identified targets with reference track signatures to detect humans.

25. The radar of claim 24, further comprising a plurality of millimeter-wave radar sensor circuits disposed in a ceiling of the scene, wherein the processor is further configured to stitch respective captured fields of view of each millimeter-wave radar sensor circuits of the plurality of millimeter-wave radar sensor circuits to generate a stitched data set.

* * * * *